United States Patent [19]
Mittendorf

[11] 3,863,728
[45] Feb. 4, 1975

[54] VEHICLE INSECT PROTECTION APPARATUS
[76] Inventor: Theodor H. Mittendorf, Rte. 1, Box 102, Tavares, Fla. 32778
[22] Filed: Nov. 9, 1973
[21] Appl. No.: 414,204

[52] U.S. Cl. .................................. 180/68 P, 296/91
[51] Int. Cl. ............................................ B60k 11/02
[58] Field of Search .................... 296/91; 180/68 P; 224/42.1 E; 160/215, 221

[56] References Cited
UNITED STATES PATENTS
| | | | |
|---|---|---|---|
| 2,778,439 | 1/1957 | Pfingsten | 296/91 |
| 2,868,308 | 1/1959 | Biewald | 180/68 P |
| 3,000,063 | 10/1961 | Hoog | 160/215 |
| 3,527,371 | 10/1970 | Townsend, Jr. | 224/42.1 E |

FOREIGN PATENTS OR APPLICATIONS
| | | | |
|---|---|---|---|
| 632,381 | 12/1961 | Canada | 180/68 P |
| 632,464 | 12/1961 | Canada | 180/68 P |

Primary Examiner—Albert J. Makay
Assistant Examiner—Ross Weaver
Attorney, Agent, or Firm—Duckworth, Hobby & Allen

[57] ABSTRACT

An insect protection apparatus for protecting moving vehicles from insects having adjustable screen panels which may be adjusted for different vehicles. The screen panels have a deflector shield attached thereto for deflecting air currents and insects from the windshield while the screen prevents insects from passing into the radiator grill and onto the front of the vehicle. One screen panel is fixedly attached to a framework while two other panels may overlap the fixed panel and may be adjusted for different widths of vehicles. The apparatus includes an easily attachable supporting system for the apparatus which is attached to the vehicle license plate holder and to the vehicle tire wells and has braces engaging the front end of the vehicle for ease in attaching or removing the apparatus from the vehicle.

5 Claims, 6 Drawing Figures

PATENTED FEB 4 1975

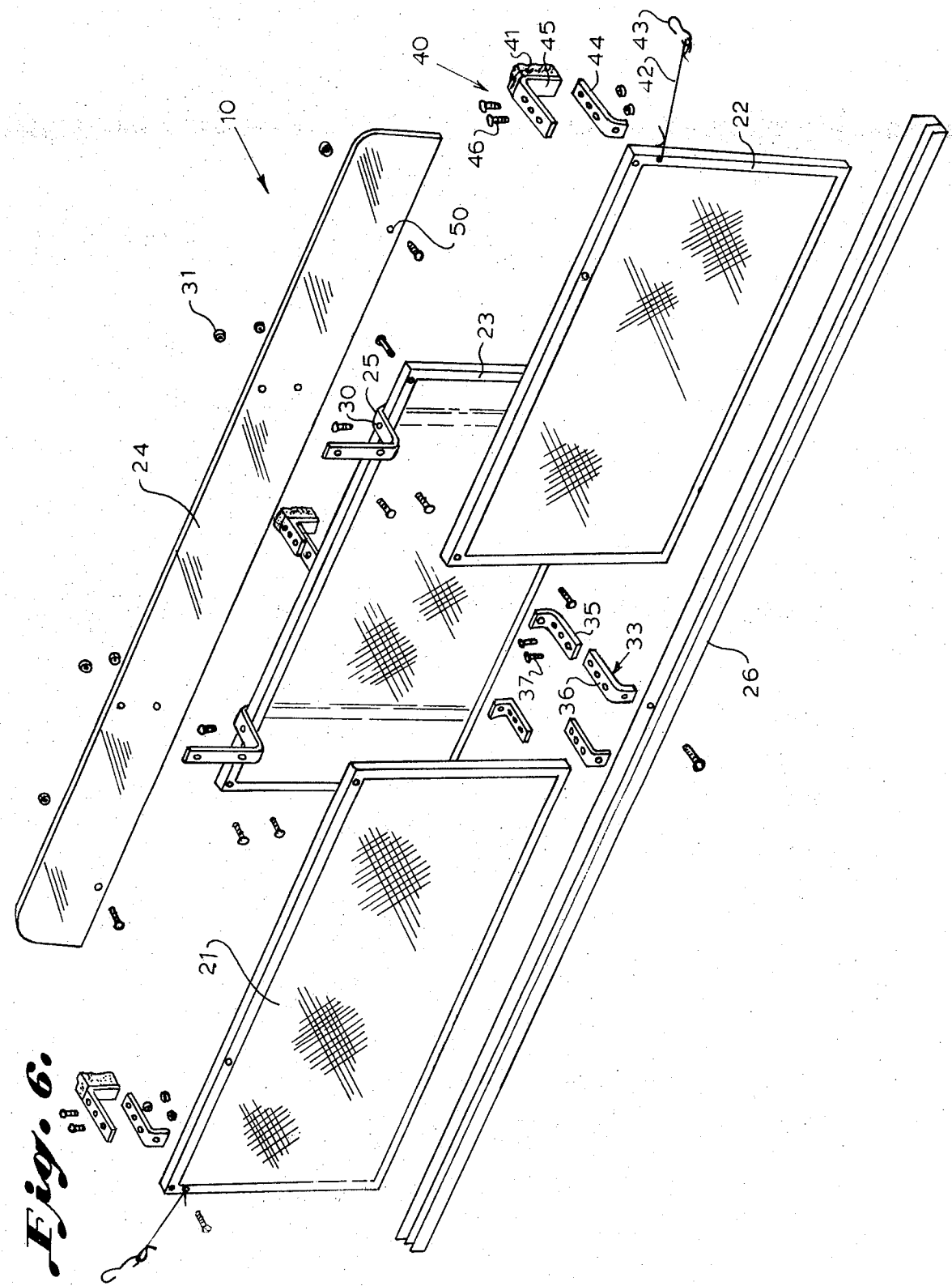

VEHICLE INSECT PROTECTION APPARATUS

BACKGROUND OF THE INVENTION

The present invention relates to a vehicle protection device for preventing insects and other materials from messing up the windshield and front end of a moving vehicle and from stopping up the radiator of the vehicle.

In the past it has been common to provide a great many deflectors for placement on different portions of a vehicle for controlling air currents and to prevent windshields from becoming messed up. One such deflector is placed on the top rear of a station wagon or automobile to control air currents to prevent the rear window from becoming covered with dirt, and the like from the eddy currents created by the vehicle. Other such devices provide deflectors placed on the hood, or on the side vent windows for either controlling the air current or deflecting insects to prevent the insects from splattering against the windshield or from getting into the automobile. One prior U.S. Pat. No. 3,269,455 teaches a bug screen employing a metallic frame having spring loaded latching means for attaching to the front of a vehicle. Such screens are used for catching insects while similar screens on the front of vehicles are also used to prevent other trash from getting into the radiator as well as providing some crash protection for passengers in the vehicle. In addition, the present invention provides for protection for the headlights which can lose some of their reflectiveness by a large number of insects being splattered thereon and from hitting the windshield which reduces the visibility of the driver and passengers in the vehicle. This problem is especially acute in some southern states where twice a year lovebugs enter their breeding season with very large numbers of slow moving mating bugs around the highways which can completely cover the front end and windshield of a vehicle. The bugs are very difficult to clear off of the windshield and front of the vehicle and to remove from the vehicle's radiator. One protection system that has been suggested wraps a piece of screen around the front end of the vehicle. This, however, does not protect the windshield of the vehicle and still allows the front end of the vehicle to become messed up by the splattered bugs ooozing through the screen onto the front of the vehicle.

Other prior art includes U.S. Pat. No. 2,792,254 which is a bug and gravel shield for vehicles and includes air guides to direct air currents hitting the front of the vehicle, and U.S. Pat. No. 2,778,439 which is a combination radiator screen and insect deflector for windshields. U.S. Pat. No. 2,726,727 illustrates bracing means for the upper portion of automobile protective screens, and U.S. Pat. No. 2,868,308 illustrates a bug shield for automobiles having an attached shield. These prior patents, however, do not illustrate a combination of an insect protection screen and windshield bug deflector which are adjustable for a great variety of vehicles by having sliding or telescoping screen panels for adjusting for different width automobiles and which are attachable to a great variety of automobiles by the flexibility of the attaching system which attaches fixed but adjustable brackets to the vehicle license plate holder for holding the bottom of the screen system away from the front of the vehicle and provides adjustable cushioned braces for bracing the top portion of the screen system against the front of the vehicle while the flexible elastic cords attach the screen panels to the tire wells with hooks that engage the tire wells. The system can thus be rapidly attached and detached from the vehicle.

SUMMARY OF THE INVENTION

An insect protection apparatus for moving vehicles is provided having an adjustable screen system removably attachable to the front end of a vehicle for preventing insects from passing therethrough to the front end of the vehicle and including a plurality of screen panels slidable relative to each other for adjusting to different widths for the front of different vehicles. A deflector shield is attached to the top of the screen panels for directing air currents and insects away from the vehicle windshield and the system is attached to the front of the vehicle with a fixed but adjustable bracket which attaches the bottom of the screen to the front license plate holder and by cushioned brackets on the top portion of the screen which are adjustable to brace the screen against the front end of the vehicle and flexible elastic cords attached to the top portion of the vehicle have hooked end portions which attach to the tire wells to pull the screen against the upper cushioned brackets. Additional features include a framework fixedly attached to one screen panel including a bottom grooved frame member for the slidable screen panels to slide in for making adjustments while the top of the movable screen panels is held between vertically extending frame members and the overlapping deflector shield.

BRIEF DESCRIPTION OF THE DRAWINGS

Other objects, features and advantages of this invention will be apparent from the study of the written description and the drawings in which:

FIG. 6 is an exploded view of the apparatus in accordance with FIGS. 1-5.

DESCRIPTION OF THE PREFERRED EMBODIMENT

Figure 1:
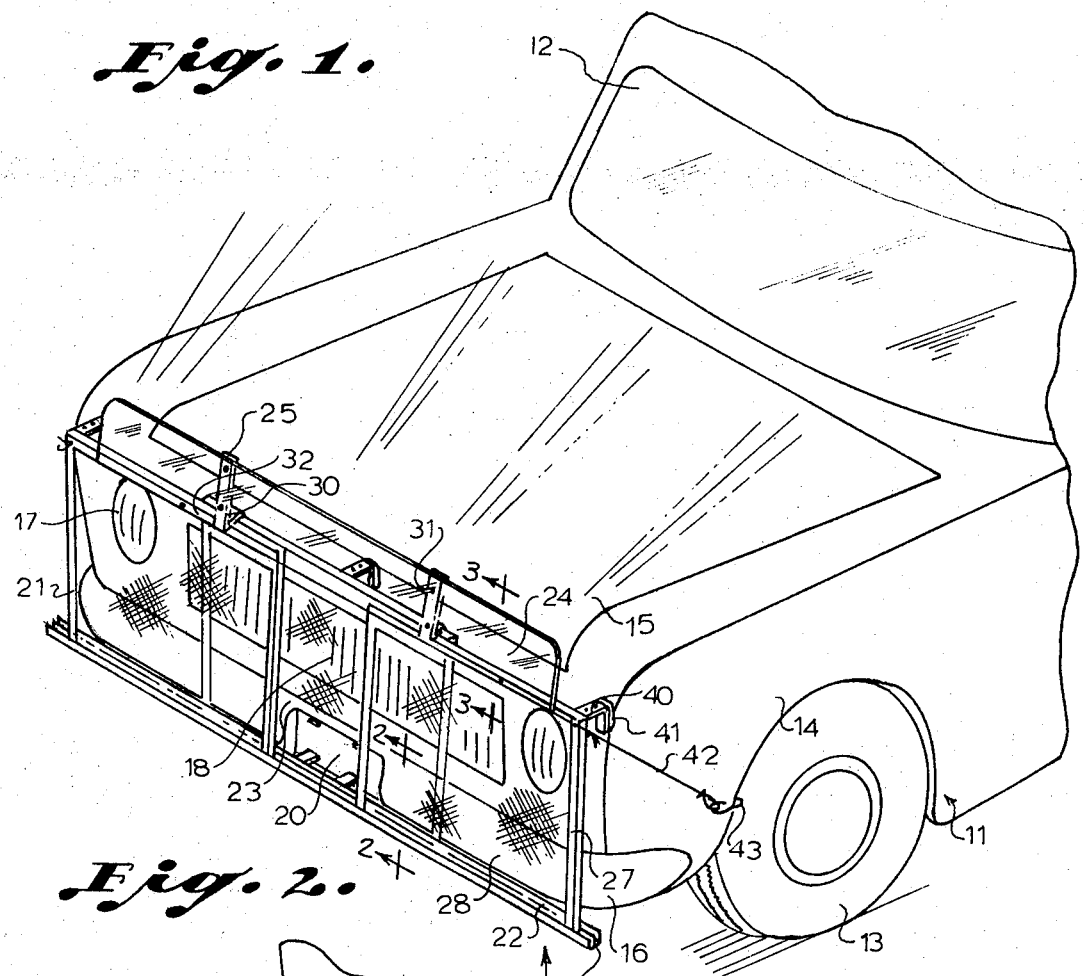
FIG. 1 is a perspective view of an insect protection apparatus for moving vehicles illustrated attached to the front end of a vehicle.
Figure 2:
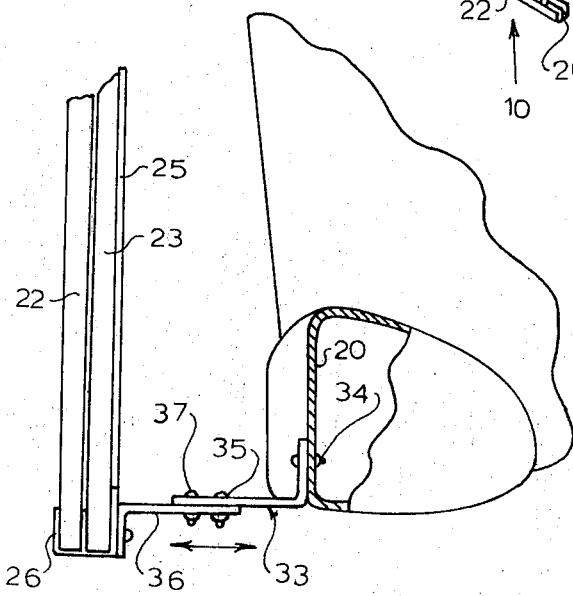
FIG. 2 is a sectional view taken along lines 2—2 of FIG. 1.

Referring now to FIG. 1, a bug screen and deflector shield 10 is illustrated for protecting the front end of a moving vehicle from insects, and is illustrated attached to a vehicle 11 which vehicle has a windshield 12, tire 13, tirewell 14, hood 15, front bumper 16, along with headlights 17, grill 18 and front license plate holder 20. The insect protection apparatus includes movable screen panels 21 and 22 which move relative to a fixed screen panel 23 and the windshield deflector screen 24 which is attached to a pair of frame members 25. Frame members 25 are also attached to the fixed screen panel 23 and to a bottom frame member 26 which bottom frame member has a pair of grooves therein, one groove having screen panel 23 attached therein and the other grooves allowing for the bottom portions of movable panels 21 and 22 to slide in and overlap the fixed screen panel 23. Each of the screen panels has a perimeter frame 27 and each panel may be of identical size. Perimeter frame 27 can be made of aluminum channeling if desired, while the screen material 28 may be of any available screen material such as plastic, fiberglass or aluminum screening. The brackets 25 extend from the frame member 26 up along the back portion of screen member 23 and have a horizontally extending portion 30 extending over the fixed screen 23 and the movable screen panels 21 and 22, and then extending upward for attachment to the deflector shield 24 by means of bolts through the openings 31. The top portion of the slidable screen panels 21 and 22 are held on the back side by the front portion of the fixed screen 23 perimeter frame portion and on the top by the horizontal portion 30 of the vertical frame members 25. Slidable screen panels 21 and 22 are held from the front by the shield 24 overlapping portion 32 which overlaps the top perimeter frame 27 of the panels 21 and 22, thus the screen can be adjusted for width by sliding the panels 21 and 22 relative to the fixed panel 23 to adjust for different size vehicle fron ends. The apparatus is held to the front of the vehicle by two fixed brackets 33 which are more clearly illustrated in FIG. 2, which brackets are attached by bolts 34 to the license plate holder 20 through two of its openings. Brackets 33 have two portions 35 and 36 which may be bolted to each other by bolts 37 to adjust the distance between the license plate holding portion of the vehicle and the bottom of the screen apparatus. FIG. 2 also illustrates the end of the fixed screen 23 and removable screen 22 sliding in the grooved frame member 26 with the front of the brackets 33 being attached to the grooved member 26. The vertically extending frame members 25 are also visible in this view.

Figure 3:
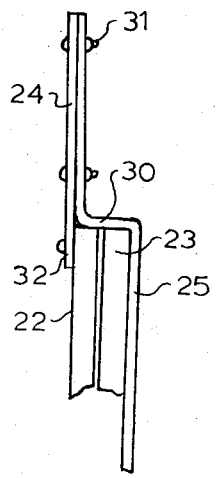
FIG. 3 is a sectional view taken along lines 3—3 of FIG. 1.

FIG. 3 more clearly shows the means for holding the slidable panels 21, 22 upper portions by having fixed panel 23 attached to the bracket 25 with the bracket 25 having the overlapping portion 30 for the top of the panel 22 to slide on, and the shield 24 attached with the bolts 31 to the frame members 25 with an overlapping portion 32 holding the front of the panel 22.

Figure 4:
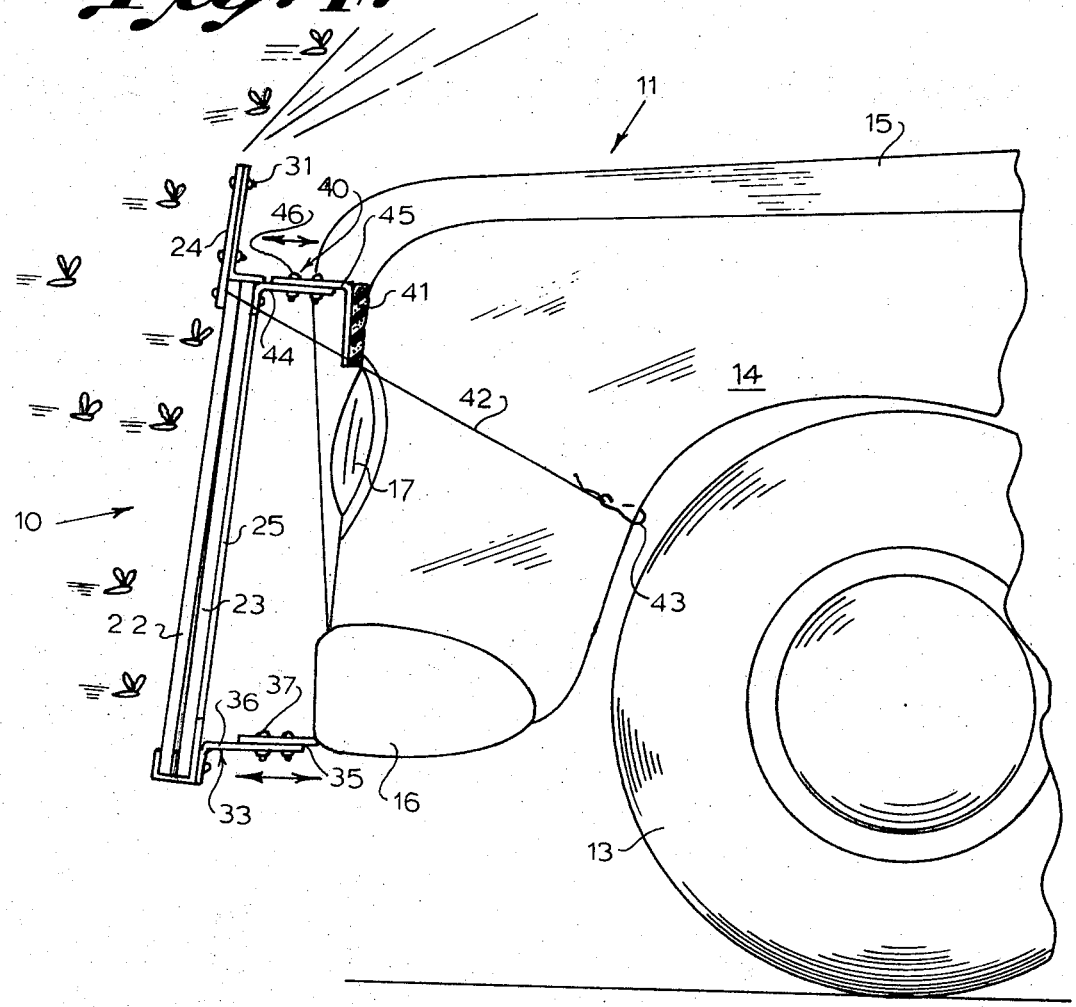
FIG. 4 is a side plan view of the apparatus in accordance with FIGS. 1-3.

In addition to the two attachment members 33 illustrated in FIGS. 1 and 4, a plurality of braces 40 is attached to the upper portion of the screen panels 21, 22 and 23 each having a foam padding 41 and each being adjustable for different vehicles so that the upper portion of the apparatus is braced against the front of the car and is further held by a pair of flexible elastic cords 42, one attached to the screen panel 21 and one to screen panel 22 at the upper portions thereof, and each cord 42 having a hook 43 attached to the other end thereof for engaging the tire well 14 of the vehicle 11.

Referring now to FIG. 4, the apparatus 10 attached to the vehicle 11 is illustrated having the fixed screen panel 23 and one movable panel 22 sliding in the grooved frame member 26 and attached by the brackets 33 to the front end of the vehicle 11, and having the upward extending frame members 25 attached to the fixed panel 23 and also holding the deflector shield 24 in place by means of bolts 31. As can be seen from this view, the braces 40 having the padding 41 to protect the front of the vehicle and also have two portions 44 and 45 bolted together with bolts 46 and may be bolted together through different openings to adjust the length of the support brace brackets 40. In the preferred embodiment one front brace member 40 is attached to each screen panel 21, 22 and 23 for bracing the front end of the vehicle at three different positions. The attaching cord 42 is also illustrated in this view with the hook member 43 attached to the tire well 14.

Figure 5:
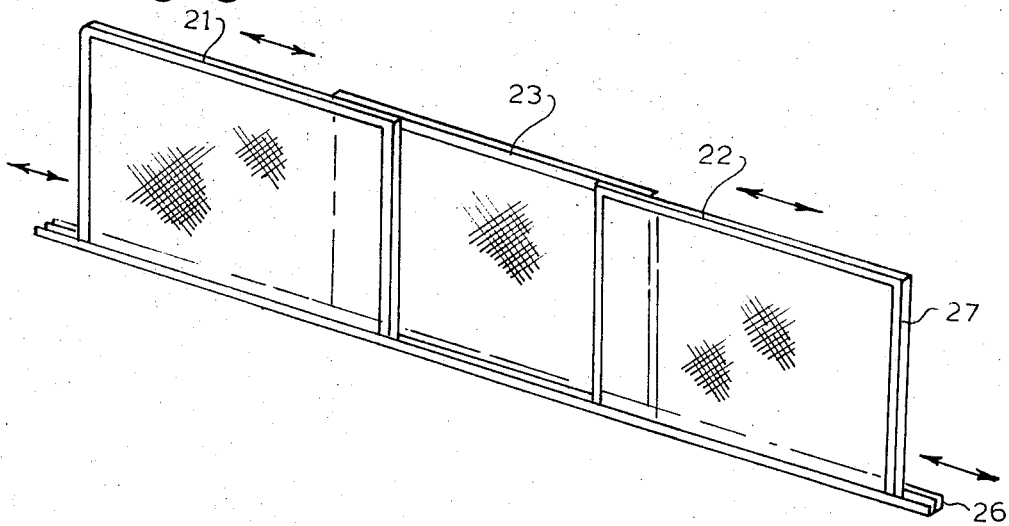
FIG. 5 is a perspective view of sliding screen panels of the apparatus in accordance with FIGS. 1-4.

FIG. 5 more clearly illustrates the adjustability of the panels 21, 22 and 23, each having a perimeter frame 27 and panels 21 and 22 sliding in the front groove of the bottom groove frame member 26 sliding a telescoping panel member to the fixed frame member 23.

FIG. 6 illustrates an exploded view to more clearly show the invention 10 having bottom frame member 26, screened panels 21, 22 and 23 along with two brackets 33, portions 35, 36 and 37 for attachment of the frame member 26 to the license plate holder. The fixed panel 23 is also held by the vertically extending brackets 25 having short horizontal portions 30 which brackets also hold the deflector shield 24 held with nuts and bolts 31. The upper support brackets 40 are each seen having members 44, 45 held together with bolts 46 and having cushioned front portions 41 for protecting the finished surface of the front of the vehicle. The attachment means also includes the flexible elastic cord 42 having the hook 43 attached to one end and being attached to the panels 21 and 22 at the other end of the flexible cord. Thus, the present invention can be rapidly adjusted for a vehicle by sliding the panels 21 and 22 to the proper width adjusting the bottom bracket 33, attaching it to the license plate holder, adjusting the upper brackets 40 for the particular vehicle, and snapping the hooks 43 onto the tire wells. The apparatus may be easily removed by simply unbolting the bolts 34 from the license plate holder and unsnapping the hooks 43, with the adjustments for the brackets 33 and 40 remaining the same for the same vehicle thereafter. The shield 24 is provided with a pair of openings 50 which can be utilized for passing a bolt therethrough through the movable panels 21 and 22, perimeter frame portions for locking the movable frames 21 and 22 in place. Since there are a wide variety of adjustments the holes in the panels 21 and 22 would be drilled following the adjustments made for the particular car. However, once this hole is drilled and the shield 24 is bolted to the panels 21 and 22, this will firmly hold the panels 21 and 22 in place without further adjustment for the particular vehicle. Additional holes may also be drilled in panels 21, 22 and 23 to bolt panels 21 and 22 to fixed panel 23 to provide a more rigid structure. It should also be pointed out that the member 26 can be eliminated and the panels 21 and 22 adjusted and bolted together at a plurality of points on their perimeter frames and that a pair of telescoping panels can be utilized in place of three panels without departing from the spirit and scope of the invention.

This invention is not to be construed as limited to the particular forms disclosed herein since these are to be regarded as illustrative rather than restrictive.

I claim:

1. An insect protection apparatus for moving vehicles comprising in combination:

a. an adjustable screen means removably attachable to the front of a vehicle for preventing insects from passing therethrough onto the front end of said vehicle, said screen means having a plurality of panels, each panel having a frame and being adjustable relative to each other panel whereby said screen means can be adjusted for different vehicles;

b. a deflector shield attached to said screen means and having a deflector surface for directing air currents and insects away from a vehicle windshield;

c. a plurality of brace members attached to said adjustable screen means for engaging the front end of a vehicle to provide support for said apparatus;

d. attachment means for attaching said adjustable screen means to the front of a vehicle, said attachment means including means for attaching one portion of said adjustable screen means to the tire well of a vehicle with flexible members and means for attaching a second portion of said screen means to the front of a vehicle with at least one rigid bracket;

e. said screen means including a horizontal grooved frame member for the bottom portion of the screen panel to fit into and a pair of vertically extending frame members attached to at least one panel member, said vertically extending frame members having said deflector shield attached thereto; and f. the top portion of said panels being held together by the overlapping portion of said panels and an overlapping portion of said deflector shield and said vertically extending frame members having a portion extending over the top of said screen panels.

2. The apparatus in accordance with claim 1 in which each said screen panel has a perimeter panel frame.

3. The apparatus in accordance with claim 2 in which said adjustable screen means includes one fixed screen panel with one sliding screen panel on either side of said fixed screen panel and overlapping said fixed screen panel.

4. The apparatus in accordance with claim 3 in which said plurality of brace members includes three cushioned braces for engaging the front of a vehicle, said cushioned braces being adjustable for different lengths to engage different vehicles.

5. The apparatus in accordance with claim 3 in which said attachment means means for attaching a second portion of said screen means to the front of a vehicle with at least one rigid bracket includes a pair of rigid brackets attachable to said vehicle license plate attachment.

* * * * *